United States Patent
Stewart et al.

(10) Patent No.: US 7,421,532 B2
(45) Date of Patent: *Sep. 2, 2008

(54) SWITCHING WITH TRANSPARENT AND NON-TRANSPARENT PORTS

(75) Inventors: Heath Stewart, Santa Barbara, CA (US); Michael de la Garrigue, Agoura Hills, CA (US); Chris Haywood, Thousand Oaks, CA (US)

(73) Assignee: Topside Research, LLC, Williamsburg, VA (US)

( * ) Notice: Subject to any disclaimer, the term of this patent is extended or adjusted under 35 U.S.C. 154(b) by 625 days.

This patent is subject to a terminal disclaimer.

(21) Appl. No.: 11/031,853

(22) Filed: Jan. 6, 2005

(65) Prior Publication Data
US 2005/0117578 A1 Jun. 2, 2005

Related U.S. Application Data

(63) Continuation-in-part of application No. 10/993,277, filed on Nov. 18, 2004.

(60) Provisional application No. 60/523,246, filed on Nov. 18, 2003.

(51) Int. Cl.
G06F 13/00 (2006.01)

(52) U.S. Cl. ..................... 710/315; 710/306; 710/313; 710/316

(58) Field of Classification Search .............. 710/316, 710/317, 306, 313, 315
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu | |
| 4,704,606 A | 11/1987 | Hasley | |
| 4,958,299 A | 9/1990 | Akada | |
| 5,550,823 A | 8/1996 | Irie | |
| 5,555,543 A | 9/1996 | Grohoski | |
| 5,617,421 A | 4/1997 | Chin | |
| 5,649,149 A | 7/1997 | Stormon | |
| 5,659,713 A | 8/1997 | Goodwin et al. | |
| 5,841,874 A | 11/1998 | Kempke | |
| 5,860,085 A | 1/1999 | Stormon | |
| 5,898,689 A | 4/1999 | Kumar | |
| 5,905,911 A | 5/1999 | Shimizu | |
| 5,923,893 A | 7/1999 | Moyer | |
| 5,961,626 A | 10/1999 | Harrison | |
| 5,982,749 A | 11/1999 | Daniel | |
| 6,067,408 A | 5/2000 | Runaldue | |
| 6,122,674 A | 9/2000 | Olnowich | |

(Continued)

OTHER PUBLICATIONS

Chi, Danny; "Ultilizing Non-Transparent Bridge in PCI Express Base(TM) to Create Multi Processor Systems. Part I"; TechOnLine Webcast; Aug. 26, 2003; hhtp://seminar2.techonline.com/~plx22/aug2603/index.shtml.*

(Continued)

*Primary Examiner*—Glenn A Auve
(74) *Attorney, Agent, or Firm*—SoCal IP Law Group LLP; Steven C. Sereboff; John E. Gunther

(57) ABSTRACT

There are disclosed apparatus and methods for switching. Transparent and non-transparent ports are provided. Data units are transferred between the transparent ports, between the transparent and non-transparent ports, and between the non-transparent ports.

16 Claims, 3 Drawing Sheets

U.S. PATENT DOCUMENTS

| | | | |
|---|---|---|---|
| 6,172,927 | B1 | 1/2001 | Taylor |
| 6,292,878 | B1 | 9/2001 | Morioka |
| 6,346,946 | B1 | 2/2002 | Jeddeloh |
| 6,389,489 | B1 | 5/2002 | Stone |
| 6,442,674 | B1 | 8/2002 | Lee |
| 6,477,623 | B2 | 11/2002 | Jeddeloh |
| 6,493,347 | B2 | 12/2002 | Sindhu |
| 6,510,138 | B1 | 1/2003 | Pannell |
| 6,557,053 | B1 | 4/2003 | Bass |
| 6,574,194 | B1 | 6/2003 | Sun |
| 6,611,527 | B1 | 8/2003 | Moriwaki |
| 6,708,262 | B2 | 3/2004 | Manning |
| 6,714,555 | B1 | 3/2004 | Excell |
| 6,735,219 | B1 | 5/2004 | Clauberg |
| 6,795,870 | B1 | 9/2004 | Bass |
| 2001/0037435 | A1 | 11/2001 | Van Doren |
| 2002/0061022 | A1 | 5/2002 | Allen |
| 2002/0099855 | A1 | 7/2002 | Bass |
| 2002/0114326 | A1* | 8/2002 | Mahalingaiah ............... 370/389 |
| 2002/0122386 | A1 | 9/2002 | Calvignac |
| 2002/0165947 | A1 | 11/2002 | Akerman |
| 2002/0188754 | A1* | 12/2002 | Foster et al. ................. 709/238 |
| 2003/0084219 | A1* | 5/2003 | Yao et al. ..................... 710/300 |
| 2003/0084373 | A1* | 5/2003 | Phelps et al. ................... 714/16 |
| 2004/0019729 | A1* | 1/2004 | Kelley et al. ................. 710/306 |
| 2004/0030857 | A1 | 2/2004 | Krakirian |
| 2004/0123014 | A1* | 6/2004 | Schaefer et al. ............. 710/313 |
| 2004/0230735 | A1 | 11/2004 | Moll |
| 2005/0117578 | A1* | 6/2005 | Stewart et al. ............... 370/389 |
| 2006/0010355 | A1* | 1/2006 | Arndt et al. .................... 714/56 |

OTHER PUBLICATIONS

Regula, Jack; "Ultilizing Non-Transparent Birdige in PCI Express Base(TM) to Create Multi Processor Systems. Part II"; TechOnLine Webcast; Oct. 21, 2003; http://seminar2.techonline.com/~plx22/oct2103/index.shtml.*

Petaswitch Solutions, Inc., The Pisces Chipset, Product Brief, 2001, http://www.peta-switch.com/products/product_brief.htm.

Petaswitch Solutions, Inc., PetaSwitch Solutions Announces Raising $4 Million in First Round Financing, Press Release, 2001, http://psta-switch.com/nswsroom/press_releases.htm.

Petaswitch Solutions, Inc., Company Overview, 2001, http://www.peta-switch.com/markets/overview.htm.

Gupta, Scheduling in Input Queued Switches: A Survey, Jun. 1998, Department of Computer Sciences, Stanford University, California.

Schoenen, et al., Distributed Cell Scheduling Algorithms for Virtual-Output-Queued Switches, Dec. 1999, pp. 1211-1215, vol. 1, GLOBECOM, IEEE Global Telecommunications Conference.

Fahmy, A Survey of ATM Switching Techniques, Aug. 14, 2001, Department of Computer and Information Science, The Ohio State University.

Stiliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

Klein, PCI Express is the new I/O Solution of Choice, Article, Nov. 2004, pp. 1-5, Technology @ Intel Magazine, Intel Corporation.

Bhatt, Creating a Third Generation I/O Interconnect, White Paper, 2002, pp. 1-8, Technology and Research Labs, Intel Corporation, http://www.intel.com/technology/pciexpress/downloads/3rdgenwhitepaper.pdf.

Stam, Inside PCI Express, Article, Sep. 9, 2002, pp. 1-37, ExtremeTech, http://www.extrematech.com/article2/0,3973,522663,00.asp.

Intel, Improve Video Quality with the PCI Express x16 Graphics Interface, Sales Brief, 2004, pp. 1-2, Intel Corporation, http://www.intel.com/design/chipsets/pciexpress.pdf.

* cited by examiner

SWITCHING WITH TRANSPARENT AND NON-TRANSPARENT PORTS

RELATED APPLICATION INFORMATION

This patent is a continuation-in-part of U.S. application Ser. No. 10/993,277 filed Nov. 18, 2004, which claims priority from U.S. Application No. 60/523,246 filed Nov. 18, 2003, both of which are incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to data switches.

2. Description of the Related Art

The Peripheral Component Interconnect ("PCI") standard was promulgated about ten years ago, and has since been updated a number of times. One update led to the PCI/X standard, and another, more recently, to PCI Express. The PCI standards are defined for chip-level interconnects, adapter cards and device drivers. The PCI standards are considered cost-effective, backwards compatible, scalable and forward-thinking.

PCI buses, whether they be PCI Express or previous PCI generations, provide an electrical, physical and logical interconnection for multiple peripheral components of microprocessor based systems. PCI Express systems differ substantially from their PCI and PCI/X predecessors in that all communication in the system is performed point-to-point. Unlike PCI/X systems in which two or more end points share the same electrical interface, PCI Express buses connect a maximum of two end points, one on each end of the bus. If a PCI Express bus must communicate with more than one end point, a switch, also known as a fan out device, is required to convert the single PCI Express source to multiple sources.

The communication protocol in a PCI Express system is identical to legacy PCI/X systems from the host software perspective. In all PCI systems, each end point is assigned one or more memory and IO address ranges. Each end point is also assigned a bus/device/function number to uniquely identify it from other end points in the system. With these parameters set a system host can communicate with all end points in the system. In fact, all end points can communicate with all other end points within a system.

DETAILED DESCRIPTION OF THE INVENTION

Throughout this description, the embodiments and examples shown should be considered as exemplars, rather than limitations on the apparatus and methods of the present invention.

Description of Systems

Figure 1:
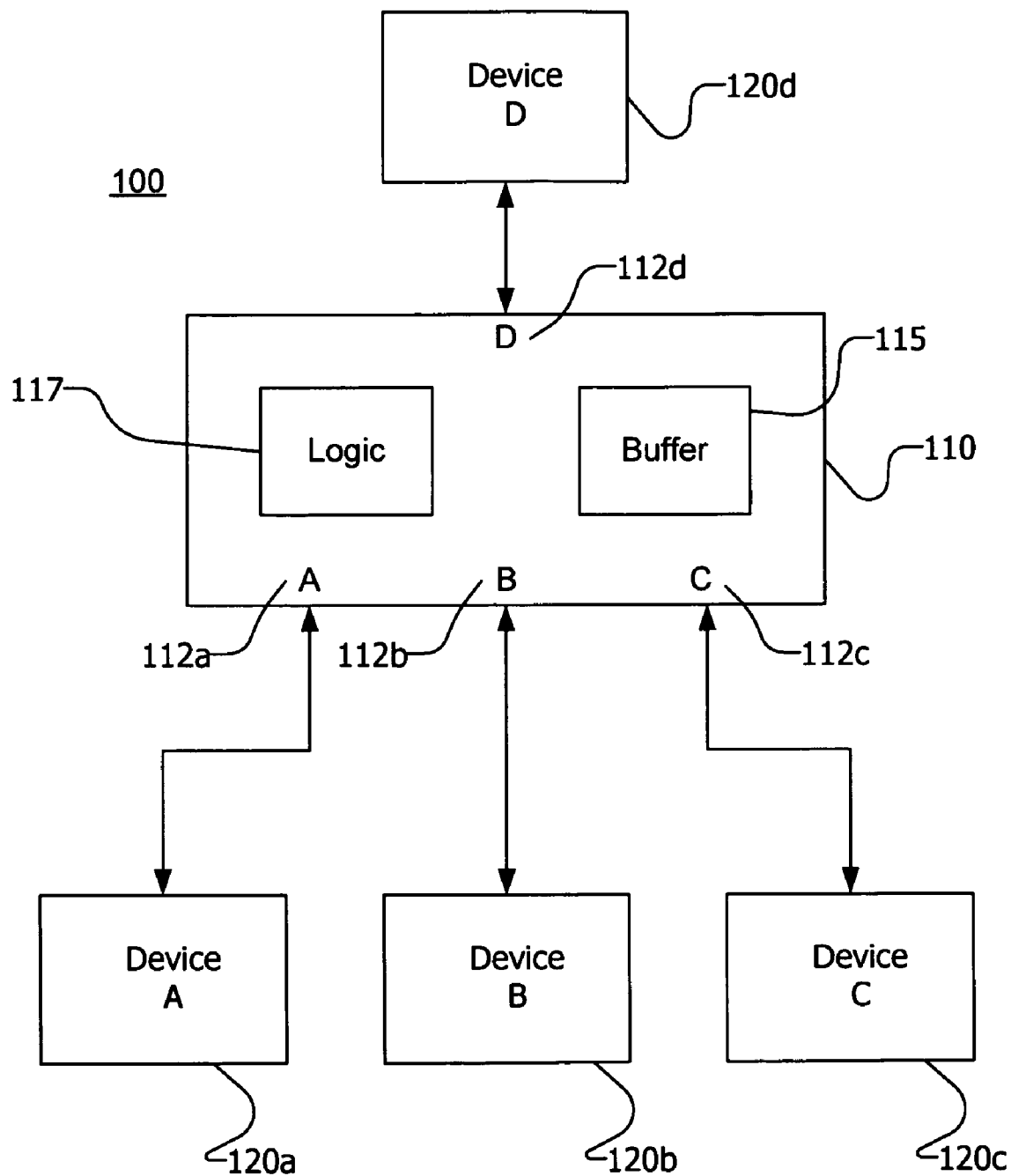
FIG. 1 is a block diagram of a switching environment.

Referring now to FIG. 1, there is shown a block diagram of a switching environment 100. The switching environment includes a switch 110 and a number of end points 120a, 120b, 120c, 120d. The switching environment 100 may be a point-to-point communications network.

The term "switch" as used herein means a system element that logically connects two or more ports to allow data units to be routed from one port to another, and the switch 110 is a switch. The switch routes data units using memory-mapped I/O or I/O-mapped I/O (both, collectively, "mapped I/O"). The switch 110 further includes a buffer 115 and logic 117. The switch 110 includes a number of ports 112a, 112b, 112c, 112d, which are physical interfaces between the buffer 115 and logic 117 and the end points 120.

By data unit, it is meant a frame, cell, datagram, packet or other unit of information. In some embodiments, such as PCI, a data unit is unencapsulated. Data units may be stored in the buffer 115. By buffer, it is meant a dedicated or shared memory, a group or pipeline of registers, and/or other storage device or group of storage devices which can store data temporarily. The buffer 115 may operate at a speed commensurate with the communication speed of the switching environment 100. For example, it may be desirable to provide a dedicated memory for individual portions (as described below) and pipelined registers for multicast portions (as described below).

The logic 117 includes software and/or hardware for providing functionality and features described herein. The logic 117 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the logic 117 may include various specialized units, circuits, software and interfaces for providing the functionality and features described herein. The invention may be embodied in whole or in part in software which operates in the switch 110 and may be in the form of firmware, an application program, an applet (e.g., a Java applet), a browser plug-in, a COM object, a dynamic linked library (DLL), a script, one or more subroutines, or an operating system component or service. The hardware and software of the invention and its functions may be distributed such that some components are performed by the switch 110 and others by other devices.

The end points 120a, 120b, 120c, 120d are logical devices which connect to and communicate with the switch 110 respectively through the ports 112. At least some of the end points may share an address domain, such as a memory address domain or an I/O address domain. The term "address domain" means the total range of addressable locations. If the shared address domain is a memory address domain, then data units are transmitted via memory mapped I/O to a destination address into the shared memory address domain.

The end points 120 may be connected to the ports 112 by electrical contacts, wirelessly, optically or otherwise.

Figure 2:
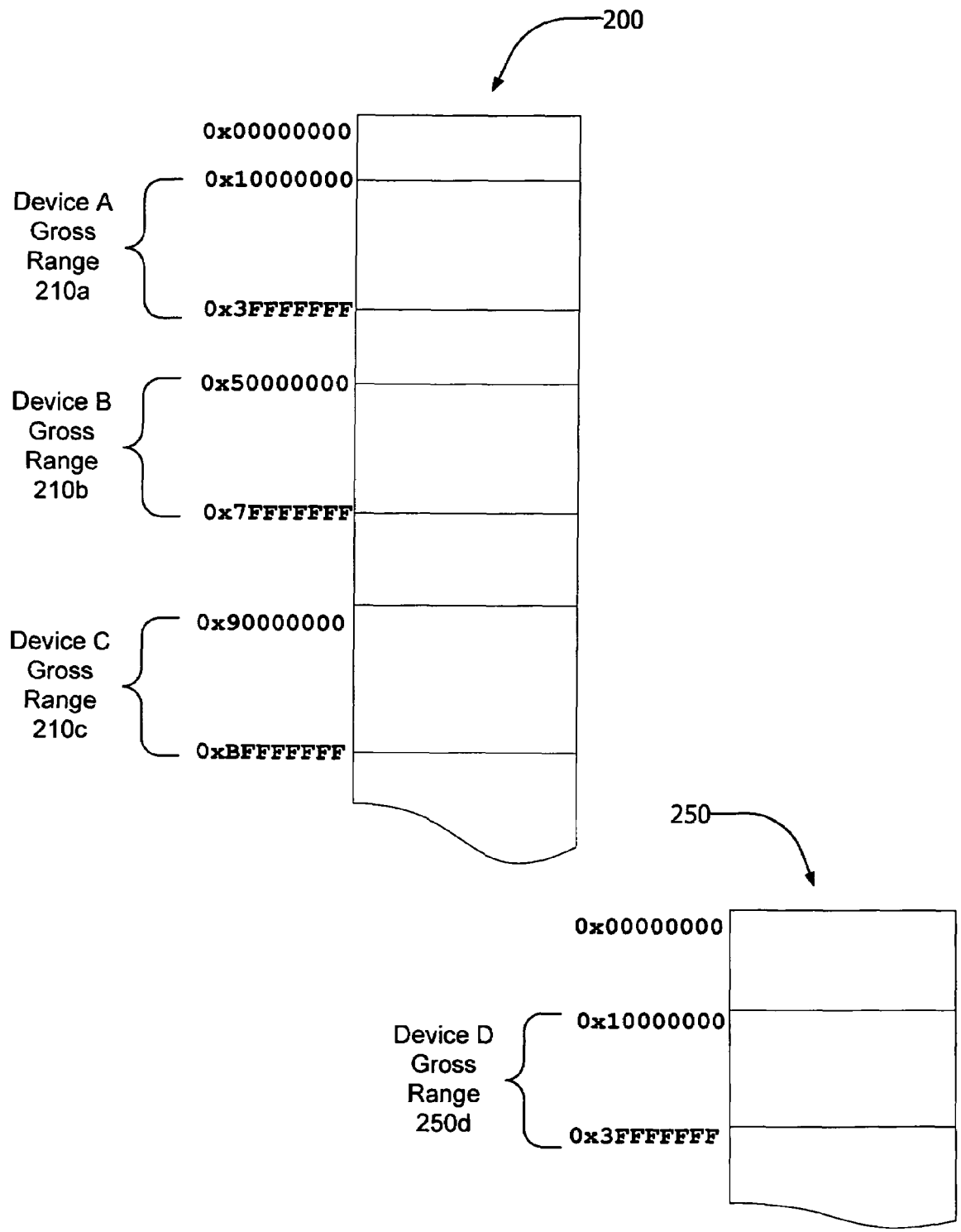
FIG. 2 is a diagram of address domains.

Referring now to FIG. 2, there is shown a diagram of two address domains 200, 250. One address domain 200 is shared by end points 120a, 120b, 120d, and the other address domain 250 is not shared and used only by end point 120d. This is just an example; there may be more than two address domains, and more than one address domain may be shared.

The address domains 200, 250 are contiguous ranges. Each address domains is defined by a master end point. Address portions associated with the individual end points 120 may be non-contiguous and the term "portions" is meant to refer to contiguous and non-contiguous spaces. The master end point for a given address domain allocates address portions to the other end points which share that address domain. The end points communicate their address space needs to the master device, and the master device allocates address space accordingly.

Data units may be written into or communicated into an address portion. In a switch conforming to the PCI Express standard, it is expected that the address portions in a 32-bit shared memory address domain or shared I/O address domain will be at least as large as the largest expected transaction, and comparable to those shown in FIG. 2.

Within the shared address domain 200, separate address portions 210a, 210b, 210c may be associated with the corresponding end points 120a, 120b, 120c. The address domain 200 may be allocated so as to provide the corresponding end points 120a, 120b, 120c with unique address portions. The address portions may be unique within the shared address domain 200 with respect to one another.

Within the non-shared address domain 250, there may be a portion 250d associated with the end point 120d. The non-shared address domain 250 is considered isolated from the shared address domain 210. Other non-shared address domains could be included, and they would also be considered isolated from the shared address domain, and from each other. By "isolated" it is meant that the address domains are separated such that interaction does not directly take place between them, and therefore uniquely addressable addresses are provided.

The address portions 210 may have various characteristics. The address portions 210 may have respective sizes. The sizes may be fixed or variable. The address portions 210 may be defined by a base address, as well as by a size or end address. The address portions 210 may come to be associated with the end points 120 through an arbitrage process, through centralized assignment (e.g., by a host or the switch 110), otherwise or through a combination of these. The address portion 210 for a given end point 120 need not be contiguous. To avoid errors, it may be desirable if the address portions 210 within the same address domain do not overlap.

Data units may be directed to one or more of the end points 120 by addressing. That is, a destination address is associated with and may be included in the data units. The destination address determines which end point 120 should receive a given data unit. Thus, data units addressed to the individual portion for a given end point 120 should be received only by that end point 120. Depending on the embodiment, the destination address may be the same as the base address or may be within the address portion.

The end points 120 may be associated with respective ports 112. Through this association, a given end point 120 may send data units to and receive data units from its associated port 112. This association may be on a one-to-one basis. Because of these relationships, the ports 112 also have associations with the address portions 210 of the end points 120. Thus, the ports 112 may be said to have address portions 210 within the address domains 200, 250.

Ports within a shared addressed domain are considered "transparent", and those not within a shared address domain are considered "non-transparent". Data units from one transparent port to another may be transferred directly. However, data units between a transparent port and a non-transparent port require address translation to accommodate the differences in their respective address domains. Transparent ports are logical interfaces within a single addressing domain. Non-transparent ports allow interaction between completely separate addressing domains, but addresses from one domain must be converted from one domain to the other.

The status of a port—transparent or non-transparent—may be fixed or configurable. The logic 117 may allow designation on a port-by-port of transparency or non-transparency, including the address domain for a given port. The switch 110 may be responsive to requests or instructions from the devices 120 to indicate such things as which address domain the devices will be in, and the address portion associated with a given device.

Description of Methods

Figure 3:
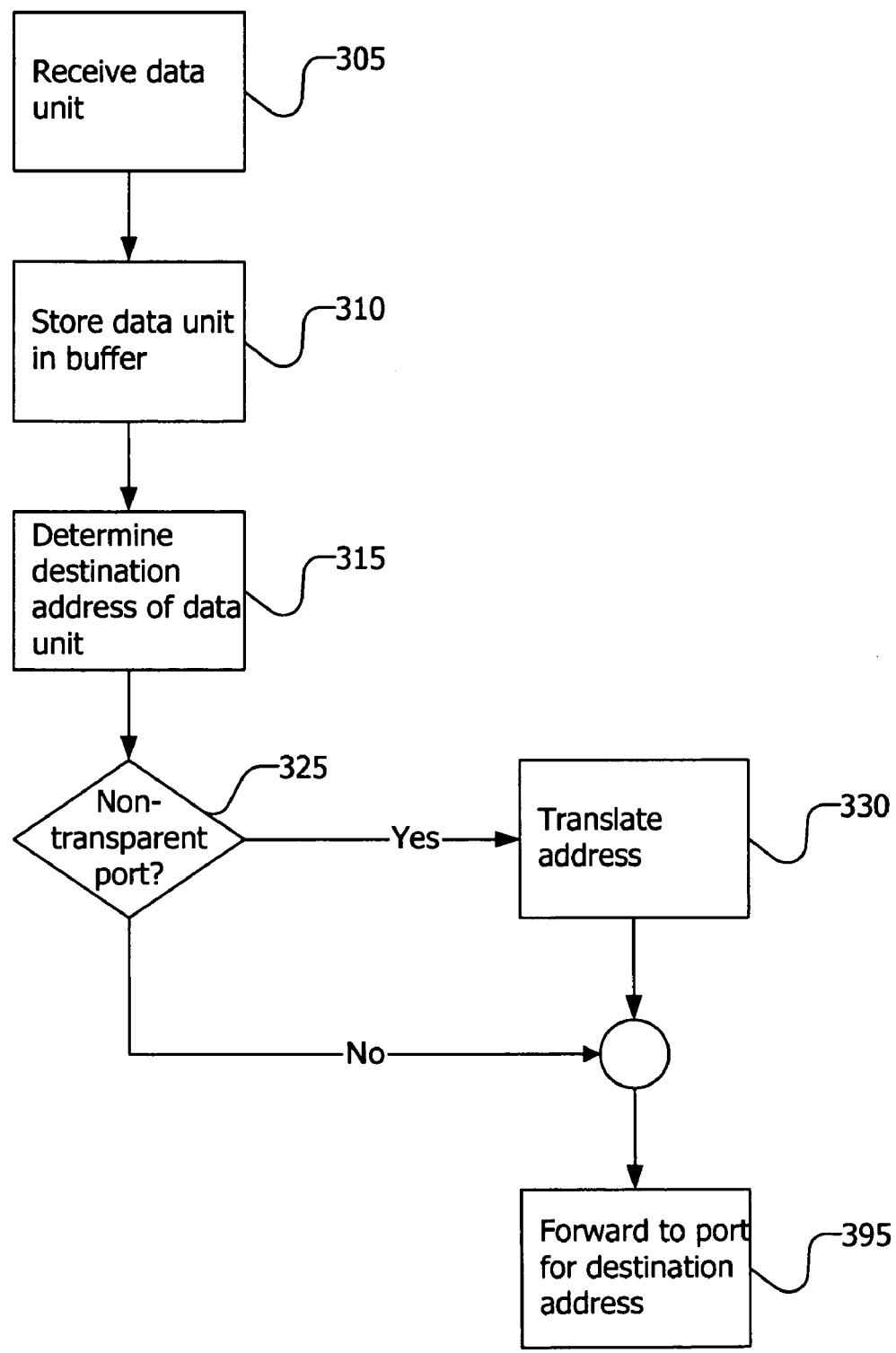
FIG. 3 is a flow chart of a process for switching data units.

Referring now to FIG. 3 there is shown a flow chart of a process for switching data units. The process employs a switch having transparent and non-transparent ports, such as the switches described above. In the switch, the transparent ports are associated with a shared address domain, and the non-transparent ports are associated with non-shared address domains.

Domain maps for each address domain may be communicated to the switch. There may be provided a master end point, such as a processor, which is responsible for allocating address portions within its address domain. End points may communicate their address space needs to the master device, and the master device may allocate address space accordingly. The master device may query end points for their address space needs. These allocations, and other allocations and designations, define the address map which the master end point communicates to the switch. The switch may receive a single communication of an address map from a master end point. The switch may receive partial or revised address maps from time to time.

In a first step 305, the switch receives a data unit. The switch then stores the data unit in a buffer (step 310). Next, the switch determines the destination address of the data unit (step 315). Next, the switch determines whether the destination address is associated with a transparent or non-transparent port (step 325).

If the address is associated with a non-transparent port, then the switch translates the address (step 330). Many different schemes of memory and I/O address translation for mapping from one address domain into another may be used. These schemes include direct memory translation both with and without offsets, and indirect memory translation through lookup registers or tables. Furthermore, addresses may be translated using schemes other than address map translation, such as mailbox mechanisms and doorbell registers.

Whether or not translated, the switch forwards the data unit to the port for the designated destination address (step 395). In this way, data units are transferred between the transparent ports, between the transparent and non-transparent ports, and between the non-transparent ports. In effect, non-transparent ports allow data transfers from one address domain to another.

In one embodiment, the switch is a PCI Express switch in which one or more of the interfaces (i.e., ports) are optionally non-transparent. A device connected to a non-transparent port of the switch is isolated from the address domain of the other ports on the switch. Two or more processors with their own address maps could all communicate with each other through this type of PCI Express switch.

With regard to FIG. 3, additional and fewer steps may be taken, and the steps as shown may be combined or further refined to achieve the methods described herein.

Non-transparent operation allows a local subsystem to maintain a full address range completely separate from the main system. In addition, the presence of the local bus is obfuscated from the main system by presenting the non-transparent bridge as an endpoint. Bus enumeration and discovery software remains unaware of the presence of the secondary local bus, allowing for a higher level of abstraction at the system level.

To provide both transparent and non-transparent ports, a transparent bridge may be associated with a different type of configuration space than a non-transparent bridge. Upon discovering the transparent type configuration space, bus enumeration and discovery software may read "through" the bridge device in an attempt to identify additional downstream devices. A non-transparent bridge, on the other hand, masks the presence of the secondary local bus by identifying itself as an endpoint. The endpoint association is made via a non-transparent type configuration header. Upon discovering a non-transparent type configuration space, bus enumeration and discovery software is satisfied and does not attempt to read through the non-transparent bridge.

A PCI Express switch (including a bridge as described herein) in non-transparent mode allows completely independent and unrestricted address ranges to exist on both sides of the bridge. Transactions passing through the bridge will have their addresses remapped to a correlating destination address. A local host processor may be responsible for maintaining address translation and configuration registers. When address configuration is complete, a primary side lockout bit may "wake" the primary PCI Express endpoint interface, allowing it to respond to bus discovery queries.

Addresses may be remapped in a three-stage process. First, the size and configuration of each address base address range is set by the local host. This allows software agents on the main host to allocate and distribute the main memory map. Next, the local host programs the translation offset. Finally, software agents on each side of the bridge perform standard PCI address mapping techniques to map the respective address regions into system memory space.

Upon receiving a transaction that falls within a given base address range, a translation function overwrites the upper bits of the address with the translated base offset, or some other address translation technique. Thus, separate address ranges are maintained on both sides of the non-transparent bridge. A downstream range may be associated with requests moving from the PCI Express to the PCI interface. An upstream range is associated with request moving from the local PCI bus to the PCI Express interface.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A switch with transparent and non-transparent physical interfaces comprising
   a first physical interface for interfacing to a first device having a first address in a first shared address domain
   a second physical interface for interfacing to a second device having a second address in the first shared address domain
   a third physical interface for interfacing to a third device having a third address in a second address domain, wherein the second address domain is isolated from the first address domain
   logic for switching data units between the first physical interface, the second physical interface and the third physical interface using mapped address I/O and masking the second address domain.

2. The switch with transparent and non-transparent physical interfaces of claim 1
   wherein the first address domain and the second address domain are selected from the group comprising memory address domains and input/output address domains.

3. The switch with transparent and non-transparent physical interfaces of claim 1
   wherein the data units are switched by the logic through one of direct memory translation with or without offsets, indirect memory translation through lookup registers or tables, a mailbox mechanism, and doorbell registers.

4. The switch with transparent and non-transparent physical interfaces of claim 1
   wherein isolation comprises separation such that interaction does not take place.

5. The switch with transparent and non-transparent ports of claim 1
   wherein the third physical interface is selectable to interface to devices in the first address domain or the second address domain.

6. The switch with transparent and non-transparent physical interfaces of claim 1 having plural transparent physical interfaces and plural non-transparent physical interfaces.

7. A system comprising
   the switch with transparent and non-transparent physical interfaces of claim 1
   a first processor having a first address domain and connected to the first physical interface
   a second processor having a second address domain and connected to the third physical interface
   wherein the first processor and the second processor can communicate with each other through the switch, and the switch masks the second address domain.

8. The switch with transparent and non-transparent physical interfaces of claim 1
   wherein the non-transparent physical interfaces are presented as endpoints, allowing a local subsystem to maintain a full address range separate from a main system.

9. The switch with transparent and non-transparent physical interfaces of claim 8
   wherein bus enumeration and discovery software remains unaware of the presence of the full address range separate from the main system.

10. The switch with transparent and non-transparent physical interfaces of claim 8
    wherein the transparent physical interfaces are associated with a separate configuration space than the non-transparent physical interfaces
    wherein bus enumeration and discovery software attempts to identify additional downstream devices.

11. The switch with transparent and non-transparent physical interfaces of claim 1
    wherein data units passing through the non-transparent physical interfaces have their addresses remapped to a correlating destination address by a local host processor responsible for maintaining address translation and configuration registers.

12. The switch with transparent and non-transparent physical interfaces of claim 1 further comprising
    a buffer for receiving data units from the transparent physical interfaces and the non-transparent physical interfaces
    software agents operable to
    translate destination addresses of devices coupled to the non-transparent physical interfaces to the second memory address domain associated with the devices prior to transfer through the non-transparent physical interfaces transfer the data units through transparent physical interfaces having destination addresses associated with devices coupled to the transparent physical interfaces.

13. A process for switching data units, the process comprising providing a switch having transparent and non-transparent physical interfaces associating the transparent physical interfaces with a shared address domain associating the non-transparent physical interfaces with non-shared address domains transferring data units between the transparent physical interfaces, between the transparent and non-transparent physical interfaces, and between the non-transparent physical interfaces.

14. The process for switching data units of claim 13 wherein transferring data units between the transparent and non-transparent physical interfaces comprises receiving data units through the transparent physical interfaces which are addressed to devices coupled to the non-transparent physical interfaces, and transmitting the data units through the non-transparent physical interfaces to the addressed devices receiving data units through the non-transparent physical interfaces which are addressed to devices coupled to the transparent physical interfaces, and transmitting the data units through the transparent physical interfaces to the addressed devices.

15. The process for switching data units of claim 13 comprising receiving data units from the transparent physical interfaces and the non-transparent physical interfaces storing the received data units in a buffer determining destination addresses of the received data units if the destination addresses correspond to devices coupled to the non-transparent physical interfaces, then translating the destination addresses to the non-shared address domain associated with the devices prior to transfer through the non-transparent physical interfaces if the data units are received from transparent physical interfaces and the destination addresses correspond to devices coupled to the transparent physical interfaces, then transferring the data units through the corresponding transparent physical interfaces without translating the destination addresses.

16. The process for switching data units of claim 13 further comprising obtaining translation offsets for the non-shared address domains.

* * * * *